United States Patent [19]
Österholm et al.

[11] Patent Number: 5,151,221
[45] Date of Patent: Sep. 29, 1992

[54] CONDUCTIVE PLASTIC COMPOSITES

[75] Inventors: Jan-Erik Österholm, Porvoo; Jukka Laakso, Helsinki; Sari Karjalainen; Pirjo Mononen, both of Porvoo, all of Finland

[73] Assignee: Berggren Oy Ab, Helinski, Finland

[21] Appl. No.: 316,774

[22] Filed: Feb. 28, 1989

[30] Foreign Application Priority Data

Jul. 29, 1988 [FI] Finland ................................. 873308

[51] Int. Cl.$^5$ ........................ H01B 1/00; C04B 35/00; C04B 35/60
[52] U.S. Cl. .................................... 252/500; 264/104
[58] Field of Search ..................... 252/500; 526/256; 204/59 R; 264/104

[56] References Cited

U.S. PATENT DOCUMENTS

| | | | |
|---|---|---|---|
| 4,731,311 | 3/1988 | Suzki et al. ......................... | 429/213 |
| 4,909,959 | 3/1990 | Lemaire et al. ..................... | 252/518 |

FOREIGN PATENT DOCUMENTS

| | | |
|---|---|---|
| 0145843 | 6/1985 | European Pat. Off. . |
| 0195380 | 9/1986 | European Pat. Off. . |
| 74715 | 3/1988 | Finland . |
| WO8700677 | 7/1985 | PCT Int'l Appl. . |
| WO8505728 | 12/1985 | PCT Int'l Appl. . |

OTHER PUBLICATIONS

Chemical Abstracts, vol. 106 (1987) abstract No. 34285u, Jpn.Kokai Tokkyo Koho JP 61,127,737.

*Primary Examiner*—Mark L. Bell
*Assistant Examiner*—Deborah Jones
*Attorney, Agent, or Firm*—Tilton, Fallon, Lungmus & Chestnut

[57] ABSTRACT

The invention relates to a conductive polymer composite wherein the internally conductive polymer component consists of a polymer of a 3-substituted thiophene, the polymer being doped with a suitable electron acceptor or electron emitter compound. The polymer composite is prepared by processing in molten state by various methods such as extrusion molding, injection molding, compression molding, or sheet blowing, together with a suitable polymer matrix, to form a homogenous composite.

7 Claims, 1 Drawing Sheet

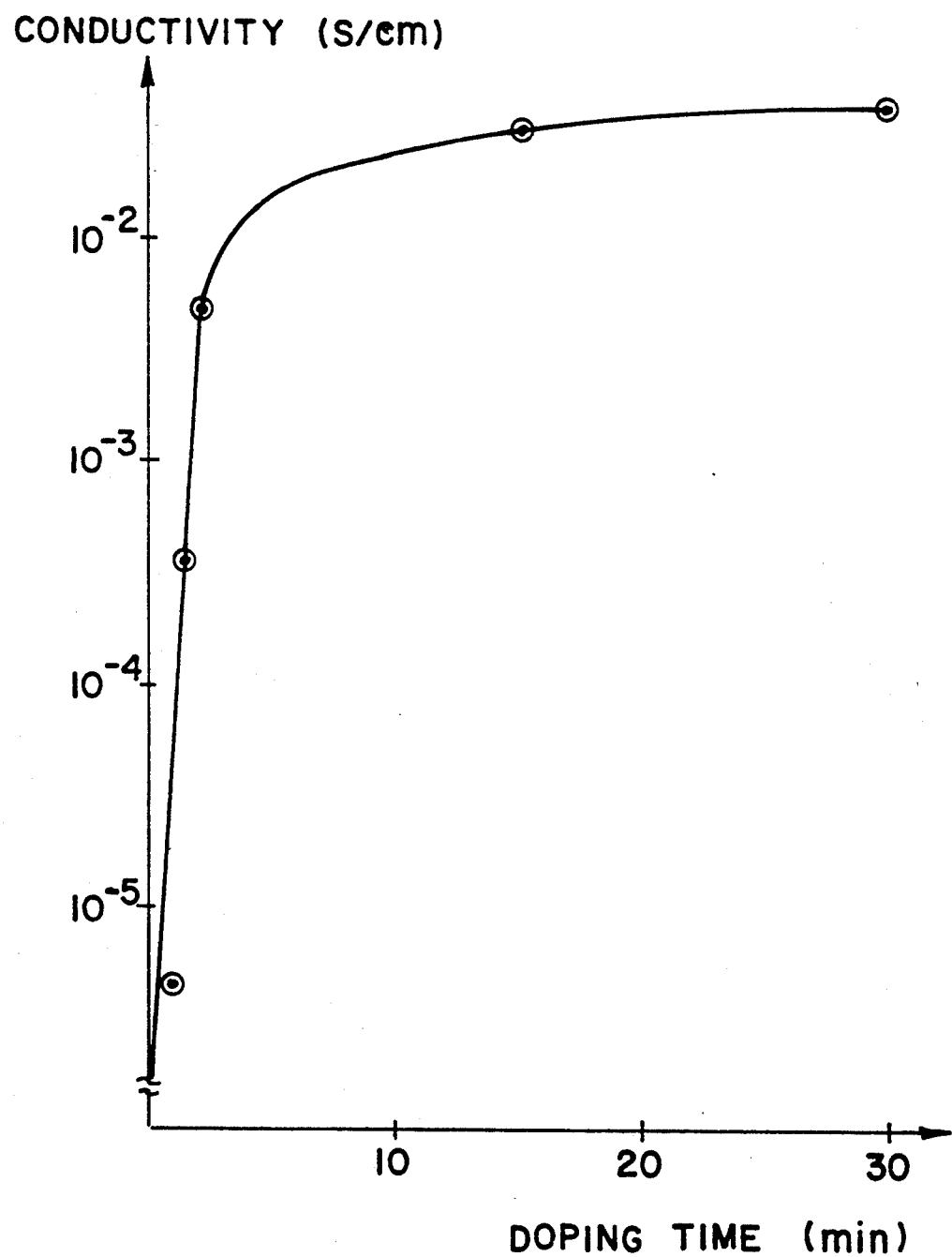

CONDUCTIVE PLASTIC COMPOSITES

The invention relates to a conductive polymer composite which consists of a polymer matrix or a polymer substrate, an internally conductive doped polymer, and possibly additives of plastics, and to a process for preparing it.

Internally conductive polymers can be produced from organic polymers having long chains of conjugated double bonds. The pi electrons in the double bonds can be disturbed by adding to the polymer certain dopants which are either electron acceptors or electron emitters. Thus gaps or extra electrons are produced in the polymer chain, enabling electric current to travel along the conjugated chain. The conductivity of the polymers can be regulated, depending on the dopant concentration, so as to cover almost the entire conductivity range from insulants to metals. Such conductive polymers have many interesting applications. Polyacetylene, poly-p-phenylene, polypyrrole, polythiophene, and polyaniline are examples of such polymers.

Conductive polymers constitute a group of materials subject to intensive research world-wide. These materials provide a possibility to replace metal conductors and semi-conductors in many applications, such as batteries, light cells, printed circuit boards, antistatic packaging materials, and electromagnetic interference (EMI) shields. The potential advantages of conductive polymers over metals are their light weight, mechanical properties, stability against corrosion, and less expensive synthesis and processing methods. It should, however, be pointed out that the processing and stability properties of most of the internally conductive polymers do not today allow their use in the said applications.

Conductive plastic composites are usually prepared by mixing carbon black, carbon fibers, metal particles, or metal fibers with a matrix plastic in molten state. In plastic composites of this type, conductivity is dependent on the mutual contacts among the filler particles. Usually, well dispersed filler is needed at a rate of approximately 10–50% by weight to obtain well conductive composites. Such composites involve many problems: the mechanical properties of the composites worsen crucially as the filler concentration increases, the conductivity is difficult to control, especially within the semi-conductor range, and homogenous dispersing of the filler into the matrix plastic is difficult.

It is to be expected that if it were possible to prepare a homogenous plastic composite consisting of an internally conductive polymer (which would serve as the conductor) and of a matrix plastic (which would give the composite the required mechanical properties), it would be possible to prepare a composite having superior properties as compared with the above-mentioned composites.

Conductive composites in which one of the components of the composite is an internally conductive polymer are known. Polyacetylene is polymerized into a polyethylene film impregnated with a catalyst [M. E. Galvin and G. E. Wnek, Polym. Commun., 23, (1982), 795].

Polypyrrole can be electrochemically polymerized into a plastic matrix, whereby a conductive composite is obtained the mechanical properties of which are better than the mechanical properties of pure polypyrrole (S. E. Lindsey and G. B. Street, Synthetic Metals, 10:67, 1985). Polypyrrole has also been used as the conductive component in polypyrrole cellulose composites (R. B. Björklund and I. Lundström, Electronic Materials, Vol. 13 No. 1, 1984, pp. 211–230, and DE Patent Application 33 21 281). By diffusing a pyrrole monomer or an aniline monomer into a matrix polymer, whereafter the impregnated matrix polymer is treated with an oxidant such as iron(III) chloride, $FeCl_3$, a conductive plastic composite is obtained (U.S. Pat. No. 4,604,427, 1986), in which polypyrrole or polyaniline serves as the electric conductor.

Recently there have been developed substituted polythiophenes which are soluble in conventional organic solvents [R. L. Elsenbaumer, G. G. Miller, Y. P. Khanna, E. McCarthy and R. H. Baughman, Electrochem. Soc., Extended Abst. 85-1 (1985) 118]. From published application EP-203 438 (1986, Allied Corporation) there are known solutions which consist of substituted polythiophene and an organic solvent and which can be used for making conductive polymer articles such as films.

The possibility that polymers containing long, conjugated carbon-carbon chains, such as substituted polythiophenes, could be in molten state be mixed with a matrix plastic to produce a polymer composite which is conductive after the doping has not been presented previously.

The polymer composite according to the invention is thus characterized in that the internally conductive, doped polymer is poly(3-substituted thiophene) formed in molten state.

The matrix plastic can be any thermoplast which can be processed in molten state and is compatible with poly(3-substituted thiophene. The structure of the last-mentioned polymer must also be such that the mixing, processing and possibly doping can be carried out in the presence of the matrix polymer. A combination in which the matrix plastic is an olefin polymer or an olefin copolymer and the conductive component is poly(3-alkyl thiophene) has been found to be an especially advantageous polymer composite. The composite can be processed by using, for example, extrusion molding, injection molding, compression molding, or sheet blowing.

The invention also relates to a polymer composite in which the poly(3-substituted thiophene) has been molded in molten state onto the substrate surface.

Furthermore, the invention relates to the use of conductive polymer composites produced in the above-mentioned manner in applications in which conductive properties are required.

The doping of the polymer composite with electron acceptors can be done either chemically or electrochemically. It is advantageous to treat the polymer composite with a medium which contains $FeCl_3$. The medium may be a suitable organic solvent, for example nitromethane or any other solvent or suspension medium which does not have a detrimental effect on the doping process by, for example, dissolving the poly(3-substituted thiophene). Usually it is possible to use organic solvents which dissolve the salt in question and at the same time distend the matrix plastic so that doping is possible.

After the doping, the obtained film is washed clean of excess dopant with a suitable solvent, preferably with the solvent used in the doping, and the composite is dried.

Another advantageous dopant is iodine, which is used as such for increasing the conductivity of poly(3-substituted thiophene).

The conductivity properties of the doped polymer composite can be regulated by adjusting the dopant concentration, the doping period, the temperature, and the concentration of poly(3-substituted thiophene) in the composite.

BRIEF DESCRIPTION OF THE DRAWING

FIG. 1 shows the conductivity of the composite as a function of the length of the doping time.

EXAMPLES 1. 3-octyl thiophene was prepared in accordance with EP-203 438, as follows: The corresponding Grignard's reagent was prepared from magnesium (dried, 1.6 mol) and octyl bromide (dried, 1.5 mol) in diethyl ether. The magnesium and the ether were placed in a reactor having an argon atmosphere, and the argonated octyl bromide was added gradually. To facilitate the starting of the reaction, an iodine crystal was added.

The concentration of the reagent produced was determined as follows: A 10-ml sample was taken, and it was added to 150 ml of distilled water. The indicator was added, and titration was carried out with 0.2M NaOH at 70° C.

The reagent was transferred to another reactor (argon atmosphere), into which 3-bromo-thiophene in a molar amount corresponding to the concentration of the reagent and the catalyst [dichloro[1,3-bis(diphenyl phosphino)propane] nickel(II)] were added. To start the reaction, the reactor was heated. The mixture was refluxed for 4 hours. Thereafter the mixture was placed on an ice bed and the mixture was acidified with 1.0N HCl. The mixture was washed with water in a separating funnel (three times), with saturated NaHCO (three times), and was then dried with $CaCl_2$. The mixture was distilled, and the product obtained was 3-octyl thiophene (b.p. 255° C., yield 65%).

2,5-diiodide-3-octyl thiophene was prepared as follows: 250 ml of dichloromethane, 0.4 mol of the 3-octyl thiophene prepared above, and 0.5 mol of iodine were added to a reactor (argon atmosphere). 90 ml of a mixture of nitrogen and water (1:1) was added slowly, and the temperature of the reaction mixture was slowly raised to 45° C. The mixture was allowed to reflux for 4.5 hours. Thereafter the reaction mixture was washed with water (three times), with 10% NaOH (three times), and with water (twice). Filtration and purification in a column (silica+hexane). The product obtained was 2,5 diiodide-3-octyl thiophene (yield 73%).

Poly(3-octyl thiophene) was prepared as follows: 0.3 mol of the 2,5-diiodide-3-octyl thiophene prepared above, 0.3 mol of magnesium and 200 ml of tetrahydrofuran (THF) were placed in a reactor and refluxed for 2 hours. 0.001 mol of the catalyst [dichloro[1.3-bis(diphenyl phosphino)propane] nickel(II)] was added. The reactor was cooled to 20° C. before the adding of the catalyst. The temperature was raised to 70° C. and the mixture was refluxed for 20 hours. The obtained product was poured into methanol (1200 ml of methanol +5% HCl). The mixture was allowed to mix for 2 hours. Filtration, a wash with hot water and methanol. Extraction with methanol and drying in a vacuum. The product obtained was poly(3-octyl thiophene) (a dark brown powder, yield 95%).

Preparation of Composites

2. A Brabender was used for preparing a polymer composite which contained the poly(3-octyl thiophene) prepared in Example 1 at 10% and EVA (Neste Oy product NTR-229) at 90%. The mixing temperature was 170° C., the mixing period was 10 min, and the number of revolutions was 30 r/min.

3. The polymer composite prepared in Example 2 was molded in molten state into a sheet by compression molding. The compression period was 5 min, the temperature 170° C., and the pressure 100 bar.

4. The polymer composite prepared in Example 2 was ground into granules, and a polymer composite film was further made from these by sheet blowing. The temperatures of the Brabender sectors were 150°–170° C. The film thickness was 0.09 mm.

5. The procedure was the same as in Examples 2 and 3, but the matrix plastic was EBA (Neste Polyeten Ab's product 7017).

6. The procedure was the same as in Examples 2–4, but the matrix plastic was Neste Oy's polyethylene PE-8517.

Doping

7. The polymer composite prepared in Examples 2 and 3 was doped. The composite was immersed in a concentrated $FeCl_3$-nitromethane solution (dry, argon atmosphere). After one hour's doping, a wash in a vacuum with nitromethane, and drying. The conductivity was 0.6 S/cm.

8. The procedure was as in Examples 2, 3 and 7, but the composite contained poly(3-octyl thiophene) at 5%, and the doping period was 2 hours. The conductivity was $6.10^{-6}$ S/cm.

9. The procedure was as in Examples 2, 3, 7 and 8, but the composite contained poly(3-octyl thiophene) at 20% and the doping period was 2 min. The conductivity was $7.10^{-3}$ S/cm.

10. The procedure was as in Example 9, and the conductivity was followed up as a function of the doping period (FIG. 1).

11. A film of poly(3-octyl thiophene) was molded in molten state (170° C.) by compression molding onto a substrate (polyethylene terephthalate). This was doped in a vacuum by using iodine vapor. The conductivity was 10 S/cm.

We claim:

1. A process for the preparation of a conductive polymer composite wherein a matrix polymer is mixed with a poly (3-substituted thiophene) in the molten state to make a homogeneous composite, the poly (3-substituted thiophene) is doped with an electron acceptor, and thereafter a finished composite is formed.

2. A process for the preparation of a conductive polymer composite wherein a poly (3-substituted thiophene) is molded in a molten state onto the surface of a polymer substrate and thereafter doped with an electron acceptor to produce a conductive polymer composite.

3. A process according to claim 1, wherein the forming step is carried out by known plastics processing methods.

4. A process according to claim 1, wherein said doping step is carried out by reacting the composite with an electron acceptor, either chemically or electrochemically.

5. A process according to claim 1, wherein the dopant is $FeCl_3$.

6. A process according to claim 2, wherein the doping is carried out by reacting the composite with an electron acceptor, either chemically or electrochemically.

7. A method according to claim 2, wherein the doping is performed by reacting the composite chemically with iodine vapor.

* * * * *

UNITED STATES PATENT AND TRADEMARK OFFICE
CERTIFICATE OF CORRECTION

PATENT NO. : 5,151,221

DATED : September 29, 1992

INVENTOR(S) : Osterholm, et. al.

It is certified that error appears in the above-identified patent and that said Letters Patent is hereby corrected as shown below:

Assignee:
On the Title page, item [73], delete "Berggren Oy Ab" and insert --Neste Oy--.

Signed and Sealed this

Fifth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,151,221
DATED : September 29, 1992
INVENTOR(S) : Jan-Erik Osterholm, et al.

It is certified that error appears in the above-indentified patent and that said Letters Patent is hereby corrected as shown below:

On the title page, item (73), delete "Beggren Oy Ab, Helinski, Finland" and insert --Neste Oy, Kullo, Finland--.

This certificate of correction supersedes the issue of April 5, 1994.

Signed and Sealed this

Thirtieth Day of August, 1994

Attest:

BRUCE LEHMAN

Attesting Officer    Commissioner of Patents and Trademarks